(12) United States Patent
Lee et al.

(10) Patent No.: US 11,452,179 B2
(45) Date of Patent: Sep. 20, 2022

(54) HEATING ROD AND HEATER HAVING SAME

(71) Applicant: LG INNOTEK CO., LTD., Seoul (KR)

(72) Inventors: Dong Hwa Lee, Seoul (KR); In Seong Sohn, Seoul (KR); In Jae Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 539 days.

(21) Appl. No.: 16/475,902

(22) PCT Filed: Jan. 5, 2018

(86) PCT No.: PCT/KR2018/000234
§ 371 (c)(1),
(2) Date: Jul. 3, 2019

(87) PCT Pub. No.: WO2018/128449
PCT Pub. Date: Jul. 12, 2018

(65) Prior Publication Data
US 2019/0350052 A1 Nov. 14, 2019

(30) Foreign Application Priority Data

Jan. 6, 2017 (KR) .................. 10-2017-0002426
Jan. 16, 2017 (KR) .................. 10-2017-0007114

(51) Int. Cl.
*H05B 3/03* (2006.01)
*H05B 3/48* (2006.01)
(Continued)

(52) U.S. Cl.
CPC .......... *H05B 3/50* (2013.01); *B60H 1/00457* (2013.01); *B60H 1/2225* (2013.01);
(Continued)

(58) Field of Classification Search
None
See application file for complete search history.

(56) References Cited

U.S. PATENT DOCUMENTS 3,479,490 A * 11/1969 Stark .................. H05B 3/283
219/544
4,587,402 A * 5/1986 Nishino ............... H05B 3/283
338/308
(Continued)

FOREIGN PATENT DOCUMENTS

JP 4522963 B2 8/2010
JP 2017-4613 A 1/2017
(Continued)

*Primary Examiner* — Joseph M. Pelham
(74) *Attorney, Agent, or Firm* — Birch, Stewart, Kolasch & Birch, LLP

(57) ABSTRACT

An embodiment discloses a heating rod comprising: a ceramic substrate; and a heat-radiating element that is arranged in the ceramic substrate, wherein the ratio of the thickness of the ceramic substrate to the thickness of the heat-radiating element is between 1:2 and 1:50. The embodiment discloses a heater comprising: a case; a heat-radiating module that is arranged inside the case; and a power module that is electrically connected to the heat-radiating module, wherein the power module includes a substrate part, a heat sink that is connected to the substrate part, and a ventilation part through which a fluid flows in and out to/from the heat sink.

20 Claims, 17 Drawing Sheets

(51) Int. Cl.
*H05B 3/50* (2006.01)
*B60H 1/00* (2006.01)
*B60H 1/22* (2006.01)
*H05B 1/02* (2006.01)
*H05B 3/46* (2006.01)
*H05B 3/18* (2006.01)

(52) U.S. Cl.
CPC ......... *B60H 1/2226* (2019.05); *H05B 1/0236* (2013.01); *H05B 3/03* (2013.01); *H05B 3/18* (2013.01); *H05B 3/46* (2013.01)

(56) References Cited

U.S. PATENT DOCUMENTS

| | | | | |
|---|---|---|---|---|
| 4,783,586 A | * | 11/1988 | Takeda | H05B 3/145 |
| | | | | 174/113 C |
| 5,233,166 A | * | 8/1993 | Maeda | H05B 3/10 |
| | | | | 219/270 |
| 5,560,851 A | * | 10/1996 | Thimm | H05B 3/141 |
| | | | | 219/543 |
| 6,054,690 A | * | 4/2000 | Petit | D06F 75/24 |
| | | | | 219/528 |
| 6,073,340 A | * | 6/2000 | Shirai | G01N 27/4067 |
| | | | | 219/542 |
| 6,084,208 A | * | 7/2000 | Okuda | G03G 15/2064 |
| | | | | 219/216 |
| 2001/0042746 A1 | * | 11/2001 | Tanaka | H05B 3/141 |
| | | | | 219/541 |
| 2002/0043530 A1 | * | 4/2002 | Ito | H05B 3/143 |
| | | | | 219/544 |
| 2005/0160793 A1 | * | 7/2005 | Schumann | H05B 3/283 |
| | | | | 73/31.05 |
| 2009/0101306 A1 | * | 4/2009 | Reis | F28F 13/00 |
| | | | | 165/56 |
| 2015/0319807 A1 | * | 11/2015 | Maher | H05B 3/44 |
| | | | | 219/534 |
| 2016/0200003 A1 | * | 7/2016 | Claus | H05B 3/146 |
| | | | | 425/445 |
| 2019/0381862 A1 | * | 12/2019 | Kim | F24H 9/1872 |

FOREIGN PATENT DOCUMENTS

| | | |
|---|---|---|
| KR | 10-2011-0063635 A | 6/2011 |
| KR | 10-1141960 B1 | 5/2012 |
| KR | 10-1659868 B1 | 9/2016 |

* cited by examiner

[FIG. 1]
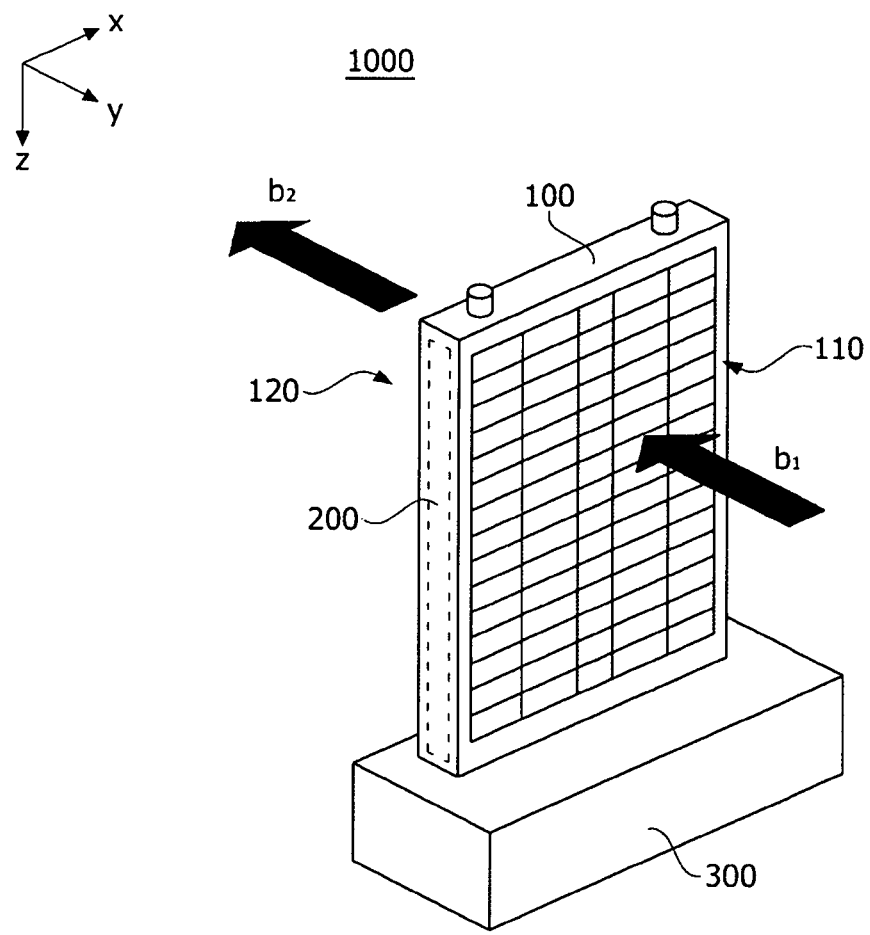

[FIG. 2]
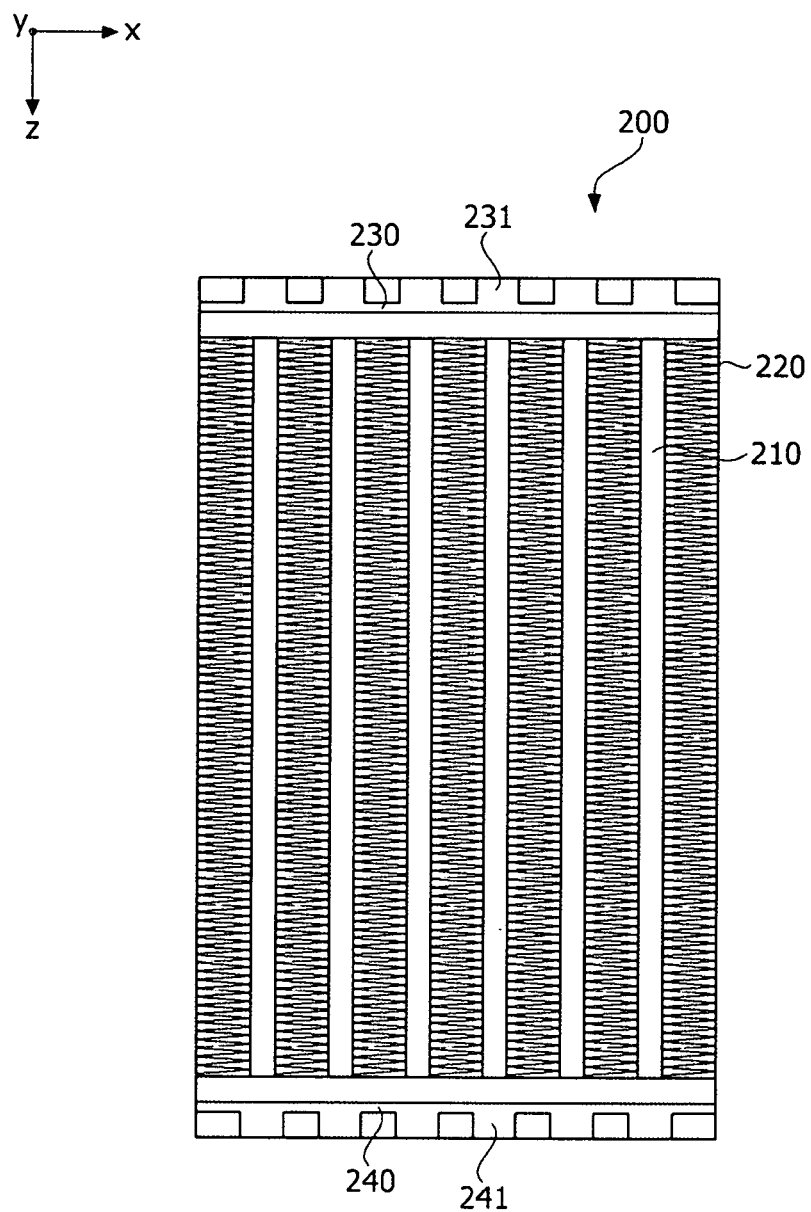

[FIG. 3]
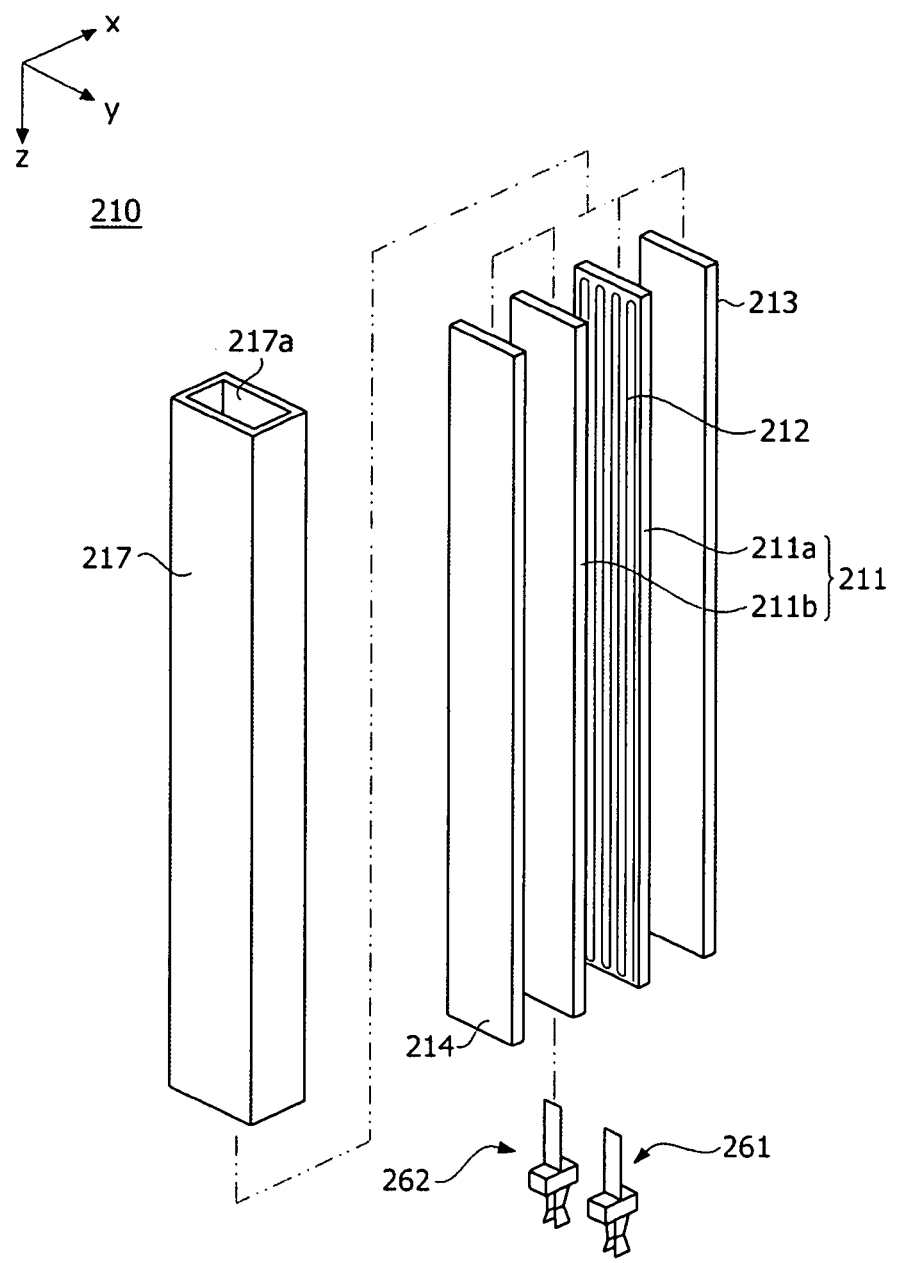

[FIG. 4]
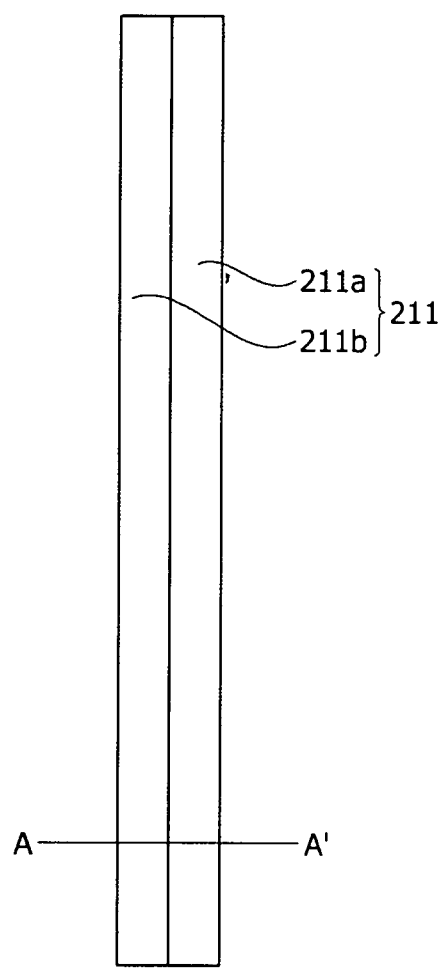

[FIG. 5]
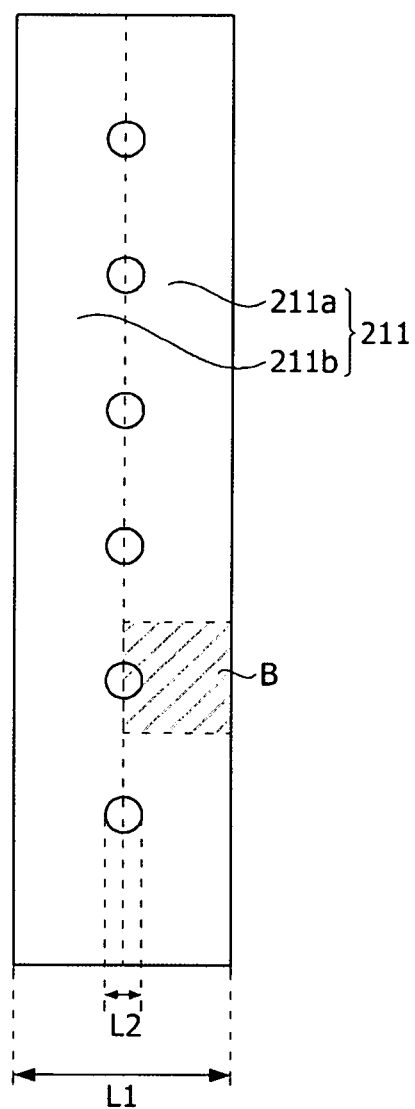

[FIG. 6]
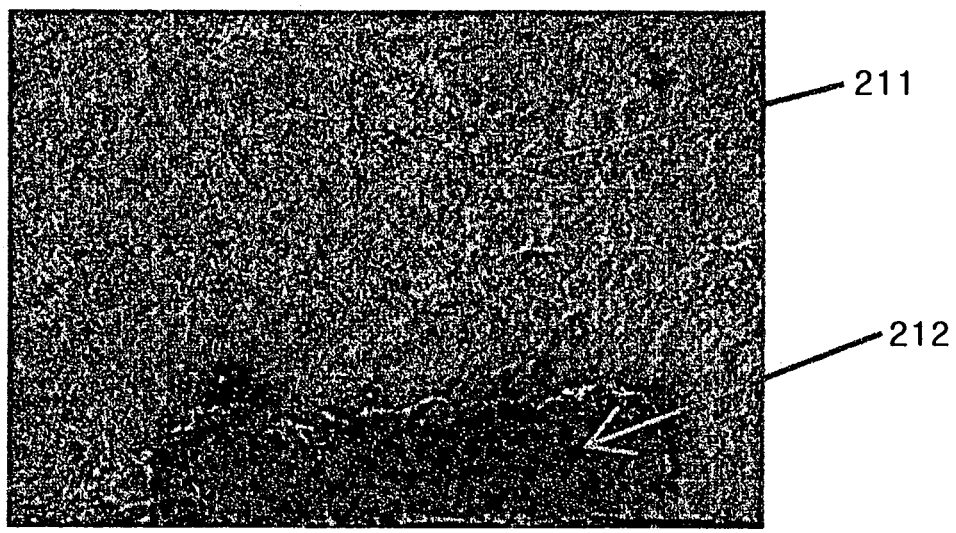

[FIG. 7]
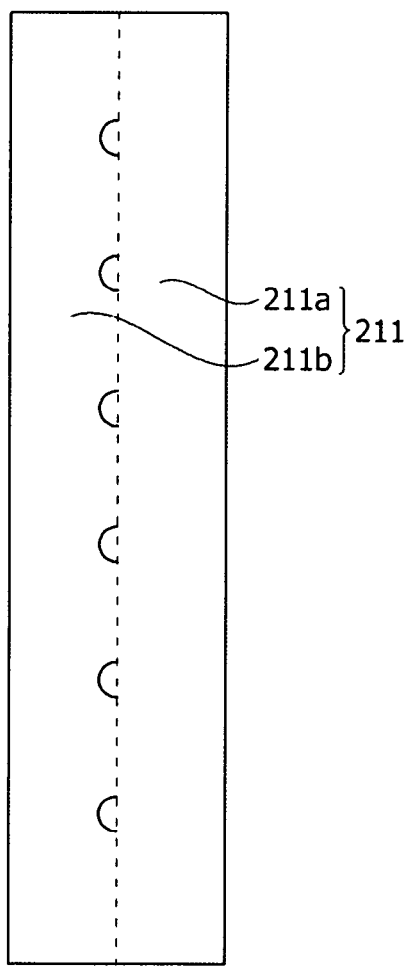

[FIG. 8]
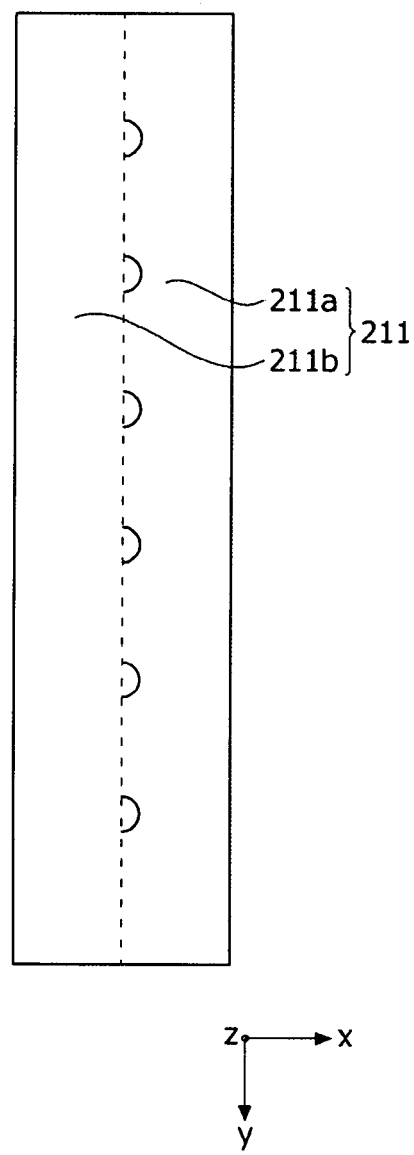

[FIG. 9]
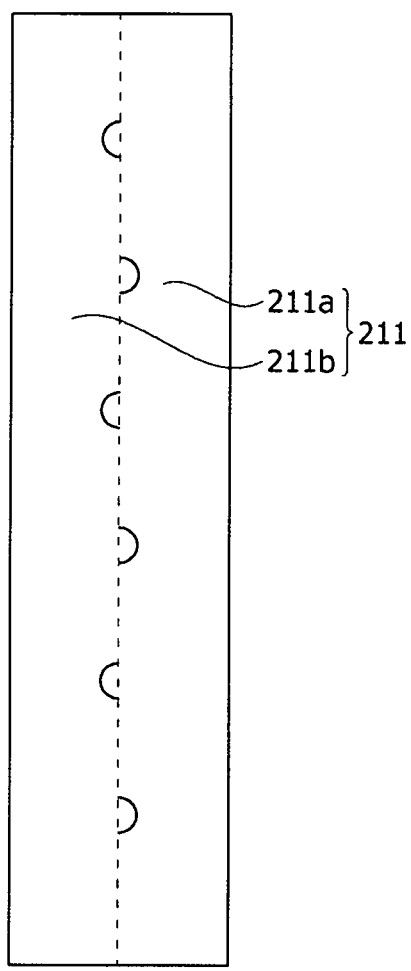

[FIG. 10]
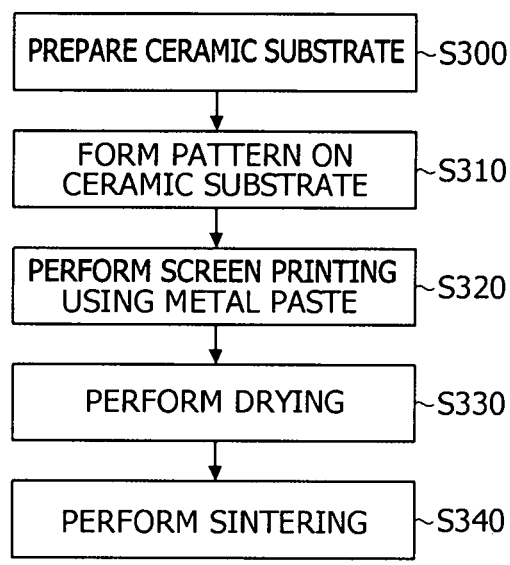

[FIG. 11]
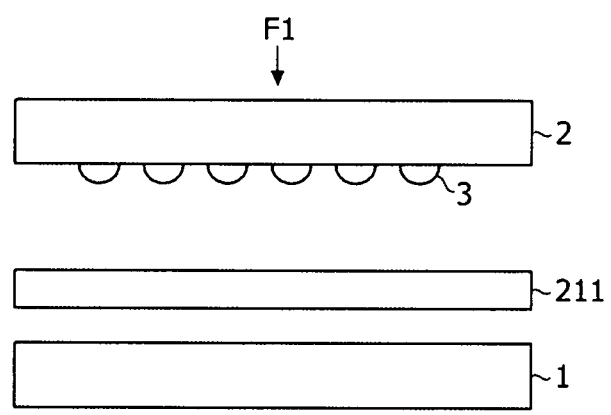

[FIG. 12]
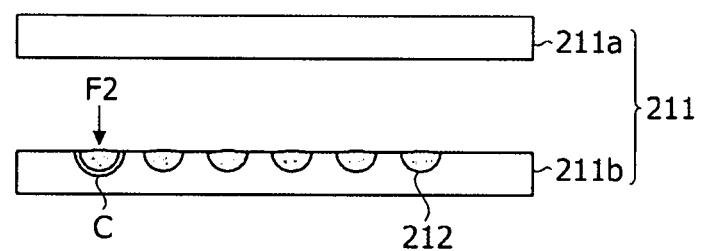

[FIG. 13]
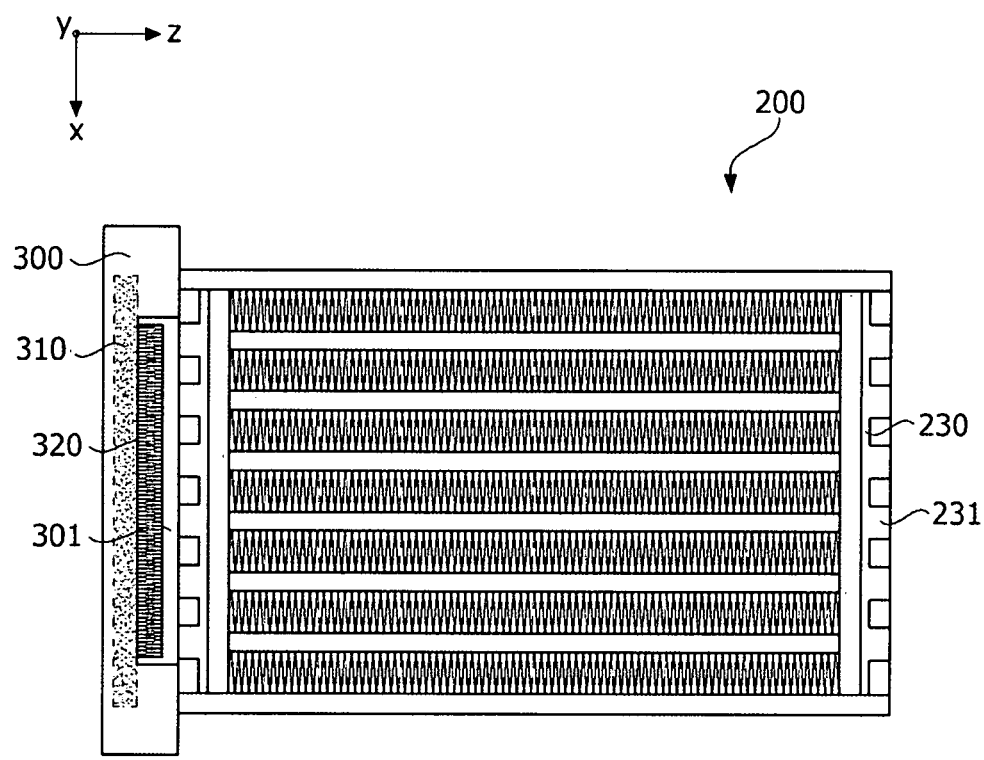

[FIG. 14]
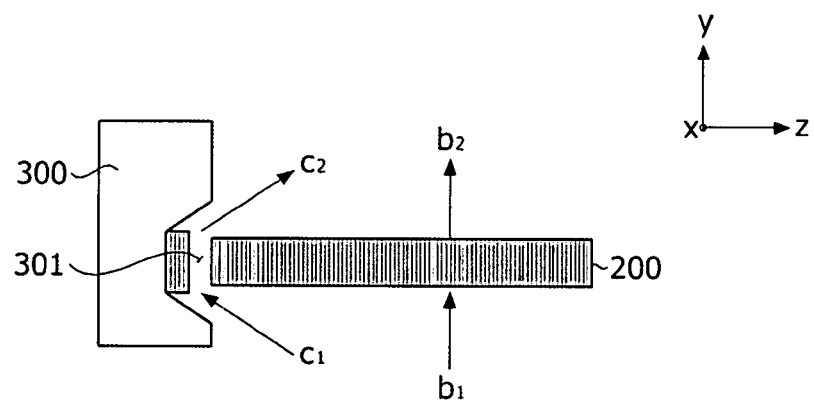

[FIG. 15A]
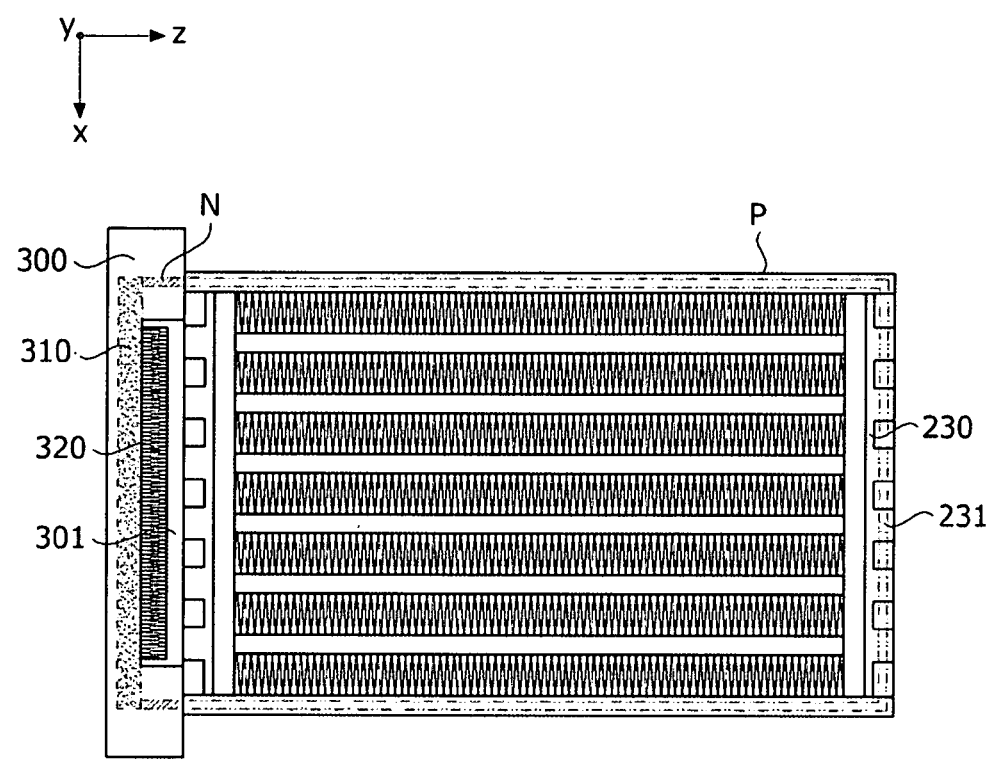

[FIG. 15B]
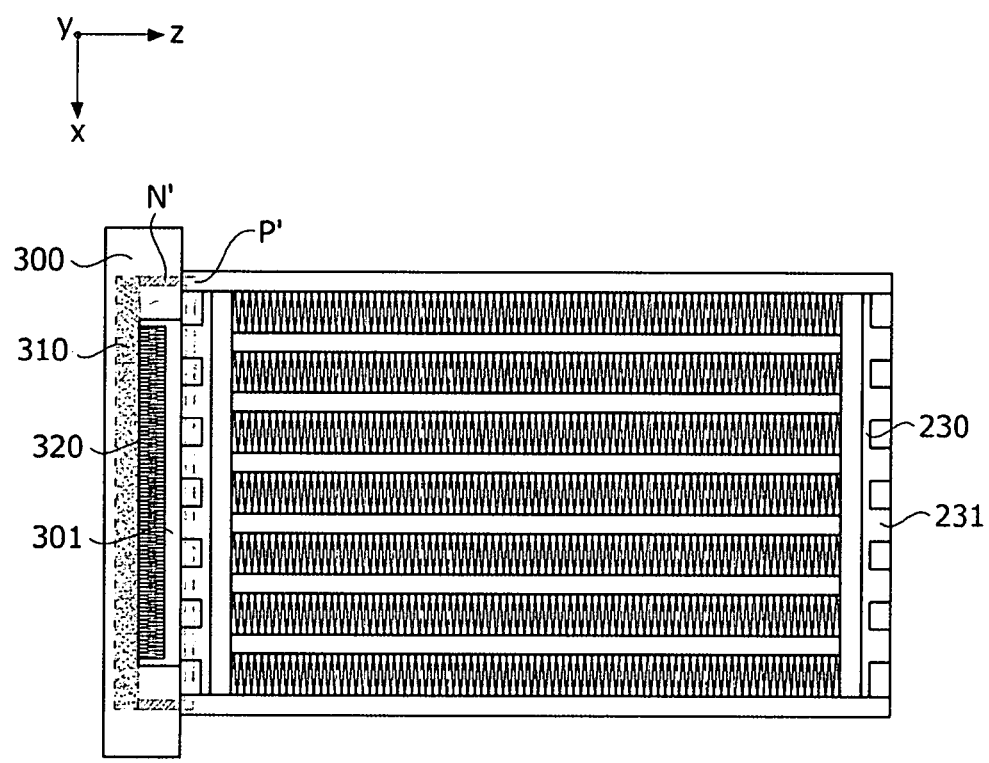

[FIG. 16]
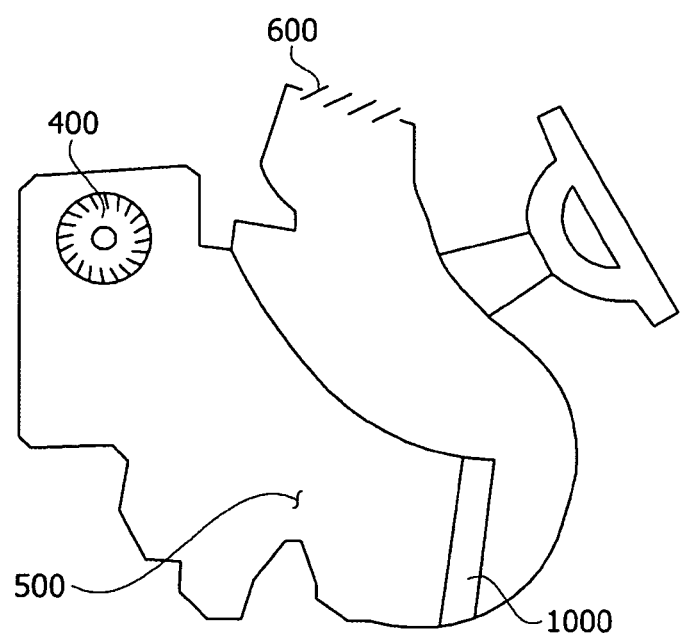

HEATING ROD AND HEATER HAVING SAME

CROSS REFERENCE TO RELATED APPLICATIONS

This application is the National Phase of PCT International Application No. PCT/KR2018/000234, filed on Jan. 5, 2018, which claims priority under 35 U.S.C. 119(a) to Patent Application Nos. 10-2017-0002426, filed in the Republic of Korea on Jan. 6, 2017, and 10-2017-0007114, filed in the Republic of Korea on Jan. 16, 2017, all of which are hereby expressly incorporated by reference into the present application.

TECHNICAL FIELD

Exemplary embodiments relate to a heating rod and a heater having the same.

BACKGROUND ART

A heater is a component of a heating system and serves to generate heat. Heaters are indispensably installed in forms of transportation such as a vehicle and the like in response to the demands of consumers and can also be called "heating appliances" or "heating devices."

Meanwhile, as concerns about environmental problems and the use of new renewable energy are rising, research and development on electric vehicles are underway. Like ordinary internal combustion engine vehicles, heating systems are installed in electric vehicles.

Since electric vehicles generate less heat (e.g., engine waste heat) as compared with internal combustion engine vehicles, it is particularly important to reduce heat losses and increase energy efficiency.

Further, due to the emergence of smart cars, smart devices and displays with various functions are being installed on a dashboard of a vehicle. As a result, a ratio of a ventilation area of an air conditioning system to an area of the dashboard of the vehicle is decreasing. That is, energy efficiency of a heater should be increased to correspond to a ventilation area of the air conditioning system which is becoming gradually smaller due to demands of design.

However, the existing vehicular heaters employ a positive temperature coefficient (PTC) thermistor such that there is a problem in that thermal efficiency is low.

Further, an ordinary heater for a vehicle has a problem in that durability of the ordinary heater is low such that structural damages occur due to an external force or sway of a vehicle body resulting from driving of the vehicle. Since these damages cause malfunction of a heating system, a solution for these damages is needed.

DISCLOSURE

Technical Problem

Exemplary embodiments are directed to providing a heating rod applied to forms of transportation and a heater having the same.

Exemplary embodiments are also directed to providing a heating rod which reduces defects due to a short-circuit.

Exemplary embodiments are further directed to providing a heating rod of which resistance is adjustable through thickness control of a heat-radiating element.

Exemplary embodiments are further directed to providing a heater with improved heat radiation efficiency.

Exemplary embodiments are further directed to providing a heating rod with an improved temperature gradient.

Technical Solution

One aspect of the present invention provides a heating rod including a ceramic substrate and a heat-radiating element disposed in the ceramic substrate, wherein a ratio of a thickness of the heat-radiating element to a thickness of the ceramic substrate is in a range of 1:2 to 1:50.

The heating rod may further include a first electrode terminal electrically connected to one end of the heat-radiating element and a second electrode terminal electrically connected to the other end of the heat-radiating element.

The ceramic substrate may include at least one among Al, zirconia toughened alumina (ZTA), and SiN.

The heat-radiating element may include at least one among Mo, Ag, Ti, Ru, W, Ni, Cr, and Al.

The heat-radiating element may be convex in at least one direction of a 1-1 direction and a 1-2 direction, wherein the 1-1 direction may be a direction from the heat-radiating element toward one surface of the ceramic substrate, and the 1-2 direction may be a direction from the heat-radiating element toward the other surface of the ceramic substrate.

The heat-radiating element may be convex in alternately.

The thickness of the heat-radiating element may be in a range of 10 μm to 100 μm.

The thickness of the ceramic substrate may be in a range of 100 μm to 1000 μm.

Another aspect of the present invention provides a heater including a case, a heat-radiating module disposed in the case and including a heating rod, and a power module electrically connected to the heat-radiating module, wherein the heating rod includes a ceramic substrate and a heat-radiating element disposed in the ceramic substrate, and a ratio of a thickness of the heat-radiating element to a thickness of the ceramic substrate is in a range of 1:2 to 1:50.

Still another aspect of the present invention provides a heating system including a flow path through which air flows, an supply part for allowing air to flow in, a discharge part for discharging air to an interior of a form of transportation, and a heater disposed between the supply part and the discharge part on the flow path and configured to heat the air, wherein the heater includes a case, a heat-radiating module disposed in the case and including a heating rod, and a power module electrically connected to the heat-radiating module, the heating rod includes a ceramic substrate and a heat-radiating element disposed in the ceramic substrate, and a ratio of a thickness of the heat-radiating element to a thickness of the ceramic substrate is in a range of 1:2 to 1:50.

Yet another aspect of the present invention provides a heater including a case, a heat-radiating module disposed in the case, and a power module electrically connected to the heat-radiating module, wherein the power module includes a substrate part, a heat sink connected to the substrate part, and a ventilation part through which a fluid flows into and out of the heat sink.

The heat-radiating module may include a plurality of heating rods, a plurality of radiation fins disposed between adjacent heating rods, and gaskets disposed on one side and the other side in the case.

The heat-radiating module may further include a connection terminal disposed in an outer portion of the heat-radiating module, and the connection terminal may electrically connect the plurality of heating rods to the power module.

The case may include an inlet and an outlet disposed to be opposite to the inlet.

A direction in which the fluid flows in and flows out may be the same as a direction from the inlet toward the outlet.

The ventilation part may be formed to pass through.

The ventilation part may be disposed adjacent to the heat-radiating module.

The ventilation part may have an area, through which the fluid passes, which is decreased in a direction in which the fluid flows out.

Yet another aspect of the present invention provides a heating system including a flow path through which a fluid moves, a supply part for allowing a fluid to flow in, a discharge part for discharging a fluid to an interior of a form of transportation, and a heater disposed between the supply part and the discharge part on the flow path and configured to heat the fluid, wherein the heater includes a case, a heat-radiating module disposed in the case, and a power module electrically connected to the heat-radiating module, and the power module includes a substrate part, a heat sink connected to the substrate part, and a ventilation part through which a fluid flows into and out of the heat sink.

Advantageous Effects

In accordance with the present invention, a heating rod and a heater having the same can be implemented.

Further, in accordance with the present invention, a heating rod which reduces defects due to a short-circuit can be manufactured.

Further, in accordance with the present invention, a heating rod of which resistance is adjustable through thickness control of a heat-radiating element and of which temperature gradient is improved can be manufactured.

Further, in accordance with the present invention, a heater which is eco-friendly and lightweight can be implemented.

Further, in accordance with the present invention, a heater with improved heat radiation efficiency can be manufactured.

Further, in accordance with the present invention, a heater with an improved pressure drop can be manufactured.

Various beneficial advantages and effects of the present invention are not limited by the detailed description and should be easily understood through a description of a detailed embodiment of the present invention.

DESCRIPTION OF DRAWINGS

FIG. 1 is a perspective view of a heater according to an embodiment of the present invention.

FIG. 2 is a plan view of a heat-radiating module according to an embodiment of the present invention.

FIG. 3 is an exploded perspective view of a heating rod according to an embodiment of the present invention.

FIG. 4 is a plan view of a ceramic substrate according to an embodiment of the present invention.

FIG. 5 is a cross-sectional view taken along line A-A' in FIG. 4.

FIG. 6 is an actual photograph showing a cross section of portion B in FIG. 5.

FIGS. 7 to 9 are cross-sectional views of ceramic substrates according to various embodiments of the present invention.

FIG. 10 is a flowchart illustrating a method of manufacturing a ceramic substrate according to an embodiment of the present invention.

FIGS. 11 and 12 are diagrams for describing formation of a pattern of a ceramic substrate according to an embodiment of the present invention.

FIG. 13 is a plan view of a heat-radiating module on which a power module is installed according to an embodiment of the present invention.

FIG. 14 is a cross-sectional view of FIG. 13.

FIGS. 15A and 15B are diagrams illustrating a connection terminal and the power module in the heat-radiating module in FIG. 13.

FIG. 16 is a conceptual diagram illustrating a heating system according to an embodiment of the present invention.

MODES OF THE INVENTION

The present invention may be modified into various forms and may have a variety of embodiments, and, therefore, specific embodiments will be illustrated in the drawings and described. The embodiments, however, are not to be taken in a sense which limits the present invention to the specific embodiments and should be construed to include modifications, equivalents, or substituents within the spirit and technical scope of the present invention.

Also, the terms including ordinal numbers such as first, second, and the like used herein may be used to describe various components, but the various components are not limited by the terms. The terms are used only for the purpose of distinguishing one component from another component. For example, without departing from the scope of the present invention, a second component may be referred to as a first component, and similarly, a first component may also be referred to as a second component. The term "and/or" includes a combination of a plurality of related listed items or any one item of the plurality of related listed items.

When a component is referred to as being "connected" or "coupled" to another component, it may be directly connected or coupled to another component, but it should be understood that yet another component may be present between the component and another component. On the contrary, when a component is referred to as being "directly connected" or "directly coupled" to another, it should be understood that yet another component may be absent between the component and another component.

The terms used herein are employed to describe only specific embodiments and are not intended to limit the present invention. Unless the context clearly dictates otherwise, the singular form includes the plural form. It should be understood that the terms "comprise," "include," and "have" specify the presence of stated herein features, numbers, steps, operations, components, elements, or combinations thereof, but do not preclude the presence or possibility of adding one or more other features, numbers, steps, operations, components, elements, or combinations thereof.

Unless otherwise defined, all terms including technical or scientific terms used herein have the same meaning as commonly understood by those skilled in the art to which the present invention pertains. General terms that are defined in a dictionary shall be construed as having meanings that are consistent in the context of the relevant art and are not to be interpreted as having an idealistic or excessively formalistic meaning unless clearly defined in the present application.

Hereinafter, embodiments of the present invention will be described in detail with reference to the drawings, the same reference numerals are given to the same or corresponding components regardless of a number of the drawing, and a duplicate description thereof will be omitted.

FIG. 1 is a perspective view of a heater according to an embodiment of the present invention, FIG. 2 is a plan view of a heat-radiating module according to an embodiment of the present invention, and FIG. 3 is an exploded perspective view of a heating rod according to an embodiment of the present invention.

Referring to FIG. 1, a heater 1000 according to an embodiment of the present invention includes a case 100, a heat-radiating module 200, and a power module 300.

The case 100 may be disposed on an outer side of the heater 1000. The case 100 is an exterior member of the heater 1000 and may be formed surrounding the heat-radiating module 200 accommodated in the case 100. The power module 300 may be disposed on one side of the case 100. The case 100 may be coupled to the power module 300.

A lower portion of the case 100 may include an accommodation part coupled to the power module 300. For example, the case 100 may be coupled to the power module 300 through a fit coupling. However, the present invention is not limited thereto.

The case 100 may be in the form of a hollow block. The case 100 may include a first surface and a second surface. Here, a plurality of inlets may be disposed on the first surface. Thus, a fluid $b_1$ may flow to the first surface. Here, the fluid may be a medium, e.g., air, for transferring heat. However, the present invention is not limited thereto.

Further, the plurality of inlets may be disposed on the first surface according to a predetermined row. Lengths of the plurality of inlets in a first direction (X-axis direction) may be varied, but the present invention is not limited thereto.

A plurality of outlets may be disposed on the second surface. A fluid $b_1$ flowing in through the first surface may be heated by the heat-radiating module 200 in the case 100 and may move through the outlets on the second surface. The outlets may also be disposed on the second surface corresponding to a predetermined row. Further, the outlets may be disposed to correspond to the plurality of inlets. Consequently, the fluid flowing in through the inlets may be smoothly discharged through the outlets. Further, a temperature of the fluid $b_1$ flowing in the inlets may be lower than that of the fluid b2 discharged through the outlets. Further, lengths of the plurality of outlets in the first direction (X-axis direction) may be varied, but the present invention is not limited thereto.

The heat-radiating module 200 may be disposed inside the case 100. The heat-radiating module 200 may be electrically connected to the power module 300 disposed on one side of the case 100. The heat-radiating module 200 may generate heat using power supplied from the power module 300.

The power module 300 may be disposed on one side of the case 100. For example, the power module 300 may be disposed below the case 100 to support the case 100 and the heat-radiating module 200. The power module 300 may be coupled to the case 100. The power module 300 may be electrically coupled to the heat-radiating module 200 to provide power thereto. One side of the power module 300 may be connected to an external power supply. Further, a mass air flow (MAF) of the heater 1000 according to the embodiment of the present invention may be 300 kg/h.

Referring to FIG. 2, the heat-radiating module 200 according to the embodiment of the present invention may include a plurality of heating rods 210, radiation fins 220, a first gasket 230, and a second gasket 240.

The heating rods 210 are heating portions and may be disposed inside the case 100. The heating rods 210 may receive power supplied from the power module 300 to generate heat. The plurality of heating rods 210 may be provided, but the present invention is not limited thereto.

The plurality of heating rods 210 may be disposed to be spaced a predetermined distance apart from each other. A plurality of radiation fins 220 may be disposed between the plurality of heating rods 210.

The heating rods 210 are connected to the radiation fins 220 such that heat generated from the heating rods 210 may be supplied to the radiation fins 220. Consequently, a fluid passing through the heating rods 210 and the radiation fins 220 may be heated such that a temperature of the fluid may rise. For heat transfer, a thermally conductive member (not shown) may be disposed between the heating rods 210 and the radiation fins 220. The thermally conductive member (not shown) may include conductive silicon, but the present invention is not limited thereto.

Referring to FIG. 3, the heating rod 210 may be formed to extend from a lower side to an upper side of the heat-radiating module 200. The heating rod 210 may include a ceramic substrate 211, a heat-radiating element 212, a first heat diffusion plate 213, a second heat diffusion plate 214, a first electrode terminal 261, a second electrode terminal 262, and a cover 217.

The ceramic substrate 211 may be disposed inside the heating rod 210 and may accommodate the heat-radiating element. The ceramic substrate 211 may be formed of a ceramic material.

Owing to the ceramic material covering the heat-radiating element 212, the heating rod 210 of the present embodiment may be lighter than the PTC thermistor, may be free from heavy metals such as lead (Pb) and the like, may radiate far infrared rays, and may have high thermal conductivity.

The first heat diffusion plate 213 may be disposed on one side surface of the ceramic substrate 211. The second heat diffusion plate 214 may be disposed on the other side surface of the ceramic substrate 211. The ceramic substrate 211 may be accommodated in the cover 217 together with the first heat diffusion plate 213 and the second heat diffusion plate 214. The ceramic substrate 211 may include a first ceramic substrate 211a and a second ceramic substrate 211b.

The first ceramic substrate 211a may be disposed on one side of the ceramic substrate 211, and the second ceramic substrate 211b may be disposed on the other side thereof. The heat-radiating element 212 may be disposed on one surface of the first ceramic substrate 211a by deposition or the like.

The first electrode terminal 261 and the second electrode terminal 262 may be disposed between the first ceramic substrate 211a and the second ceramic substrate 211b. The first electrode terminal 261 and the second electrode terminal 262 may be coupled to the first ceramic substrate 211a and the second ceramic substrate 211b.

Further, the first electrode terminal 261 and the second electrode terminal 262 may be electrically connected to the heat-radiating element 212. The first electrode terminal 261 and the second electrode terminal 262 may be disposed on outer sides of the first ceramic substrate 211a and the second ceramic substrate 211b. In this case, separate lead lines (not shown) for electrically connecting the first electrode terminal 261 and the second electrode terminal 262 to the heat-radiating element 212 may be disposed.

The heat-radiating element 212 may be disposed in the ceramic substrate 211. The heat-radiating element 212 may be disposed on the first ceramic substrate 211a by deposition or the like. The heat-radiating element 212 may be disposed on a surface of the first ceramic substrate 211a on which the first ceramic substrate 211a is in contact with the second ceramic substrate 211b.

The heat-radiating element 212 may be a heat-radiating element line. The heat-radiating element 212 may be a heat-radiating element made of tungsten (W), molybdenum (Mo), silver (Ag), titanium (Ti), ruthenium (Ru), aluminum (Al), or the like. Thus, when electricity flows, the heat-radiating element 212 may generate heat. The heat-radiating element 212 may extend from one side to the other side of the first ceramic substrate 211a and may be turned up (curved or bent) on the other side thereof. Then, the heat-radiating element 212 may extend from the other side to the one side of the first ceramic substrate 211a. The heat-radiating element 212 may be disposed to be laminated in a second direction (Y-axis direction) in which a fluid passes by repeatedly extending as described above.

With the above configuration, the fluid may sequentially pass through portions of the heating rods 210 which generate heat to receive the heat supplied therefrom while passing through the heat-radiating module 200. That is, owing to an arrangement of the heat-radiating element 212, an area in which the fluid comes into contact with the heat generated from the heating rods 210 may be increased.

Each of both end portions of the heat-radiating element 212 may be electrically connected to either the first electrode terminal 261 or the second electrode terminal 262.

The heat-radiating element 212 may receive power supplied from the power module 300 through the first electrode terminal 261 and the second electrode terminal 262. Thus, a current may flow in the heat-radiating element 212 such that the heat-radiating element 212 may generate heat. The power supplied to the heat-radiating element 212 may be controlled by the power module 300.

The first heat diffusion plate 213 and the second heat diffusion plate 214 may be respectively disposed on both side surfaces of the ceramic substrate 211. Thus, the ceramic substrate 211 may be disposed between the first heat diffusion plate 213 and the second heat diffusion plate 214. For example, the first heat diffusion plate 213 may be coupled to a side surface of the first ceramic substrate 211a, and the second heat diffusion plate 214 may be coupled to a side surface of the second ceramic substrate 211b.

The first heat diffusion plate 213 and the second heat diffusion plate 214 may be coupled to the first ceramic substrate 211a and the second ceramic substrate 211b due to an active metal layer. Here, the active metal layer may be a Ti-based active metal alloy. The active metal layer may be disposed between the first ceramic substrate 211a and the first heat diffusion plate 213. Further, the active metal layer may be disposed between the second ceramic substrate 211b and the second heat diffusion plate 214.

The active metal layer may react with the ceramic materials of the first ceramic substrate 211a and the second ceramic substrate 211b to form an oxide or a nitride. Consequently, the first heat diffusion plate 213 and the second heat diffusion plate 214 may be in contact with and coupled to the first ceramic substrate 211a and the second ceramic substrate 211b.

The first heat diffusion plate 213 may have a form in which a plurality of diffusion layers are stacked. Here, the plurality of diffusion layers may be formed by hot pressing. Similarly, the second heat diffusion plate 214 may have a form in which a plurality of diffusion layers are stacked, and the plurality of diffusion layers may be formed by hot pressing. The plurality of diffusion layers may contain copper (Cu) or Al.

A thermal expansion coefficient of each of the first heat diffusion plate 213 and the second heat diffusion plate 214 may be determined according to a predetermined condition to which a thermal expansion coefficient of the ceramic substrate 211 is reflected. That is, the thermal expansion coefficient of each of the first heat diffusion plate 213 and the second heat diffusion plate 214 may be similar to that of the ceramic substrate 211.

Alternatively, the thermal expansion coefficient of each of the first heat diffusion plate 213 and the second heat diffusion plate 214 may be equal to that of the ceramic substrate 211. Consequently, the first heat diffusion plate 213 and the second heat diffusion plate 214 may reinforce the ceramic substrate 211 which has excellent thermal conductivity but, due to having a brittle property, is easily damaged due to thermal shock.

A difference between the thermal expansion coefficient of the ceramic substrate 211 and the thermal expansion coefficient of each of the first heat diffusion plate and the second heat diffusion plate 214 may be equal to zero or in a range of 0.1 to 0.9. Preferably, the difference between the thermal expansion coefficient of the ceramic substrate 211 and the thermal expansion coefficient of each of the first heat diffusion plate 213 and the second heat diffusion plate 214 may be in a range of 0.1 to 0.5. When the difference between the thermal expansion coefficient of the ceramic substrate 211 and the thermal expansion coefficient of each of the first heat diffusion plate and the second heat diffusion plate 214 exceeds 0.9, the ceramic substrate 211 may be broken.

However, the first heat diffusion plate 213 and the second heat diffusion plate 214 may be additional configurations which may be changed due to demands of design. One of the first heat diffusion plate 213 and the second heat diffusion plate 214 may be omitted from the heating rod 210. Alternatively, both of the first heat diffusion plate 213 and the second heat diffusion plate 214 may be omitted from the heating rod 210.

A material of the cover 217 may contain Al. The cover 217 is an exterior member of the heating rod 210 and may be formed as a hollow bar or a rod, but the present invention is not limited thereto.

The cover 217 may accommodate therein the ceramic substrate 211, the heat-radiating element 212, the first heat diffusion plate 213, and the second heat diffusion plate 214. In this case, an inner surface 217a of the cover 217 may be in contact with the ceramic substrate 211, the first heat diffusion plate 213, and the second heat diffusion plate 214.

A thermally conductive silicon may be disposed between the cover 217 and the ceramic substrate 211 and between the first heat diffusion plate 213 and the second heat diffusion plate 214. The cover 217 may be in contact with the ceramic substrate 211, the first heat diffusion plate 213, and the second heat diffusion plate 214 due to the thermally conductive silicon.

The cover 217 may surround and protect the ceramic substrate 211, the first heat diffusion plate 213, and the second heat diffusion plate 214.

Further, the cover 217 may have high thermal conductivity to transfer heat generated from the heat-radiating element 212 of the ceramic substrate 211 to the radiation fins 220 in contact with the heating rod 210.

Further, the cover 217 may be inserted into the first gasket 230 and the second gasket 240. According to the embodiment of the present invention, the cover 217 may be inserted into the first gasket 230 and the second gasket 240 to support the heat-radiating module 200.

However, the cover 217 may be changed according to demands of design, and the present invention is not limited thereto.

Referring again to FIG. 2, the plurality of radiation fins 220 may be disposed inside the case 100. The plurality of radiation fins 220 may be disposed between the plurality of heating rods 210. The plurality of radiation fins 220 may be disposed to be spaced apart in the first direction (X-axis direction).

Like the heating rods 210, the radiation fins 220 may be formed to extend in a third direction (Z-axis direction). The radiation fins 220 may be louver fins, but the present invention is not limited thereto. The radiation fins 220 may each have a form in which inclined plates are stacked in the third direction (Z-axis direction). Accordingly, the radiation fins 220 may include a plurality of gaps through which a fluid may pass. The fluid may receive heat while passing through the gaps. Owing to the radiation fins 220, a heat transfer area in which the heat generated from the heating rod 210 is transferred to the fluid is increased such that heat transfer efficiency may be improved.

A length of each of the radiation fins 220 in the first direction (X-axis direction) may be in a range of 8 mm to 16 mm. When the length of each of the radiation fins 220 in the first direction (X-axis direction) is less than 8 mm, there is a problem of reducing an MAF of the heater 1000, whereas when the length of each of the radiation fins 220 in the first direction (X-axis direction) is greater than 16 mm, heat is not properly transferred to the fluid passing through the radiation fins 220 such that there is a problem of lowering a temperature rise rate of the fluid. However, the lengths of the radiation fins 220 are not limited thereto.

The first gasket 230 may be located on one side of an interior of the case 100. The second gasket 240 may be located on a lower side of the interior of the case 100. The first gasket 230 and the second gasket 240 may be coupled to the case 100 by fitting, bonding, or the like.

A plurality of first accommodation parts 231 and a plurality of second accommodation parts 241, which are disposed to be spaced in the first direction (X-axis direction), may be disposed on the first gasket 230 and the second gasket 240. The first gasket 230 may include a plurality of first protruding accommodation parts 231. The second gasket 240 may include a plurality of second protruding accommodation parts 241.

The plurality of first accommodation parts 231 and the plurality of second accommodation parts 241 may be disposed to correspond one-to-one to the plurality of heating rods 210. With the above configuration, one sides of the heating rods 210 may be inserted into the plurality of first accommodation parts 231. Further, the other sides of the heating rods 210 may be inserted into the plurality of second accommodation parts 241.

However, the heating rods 210 may extend downward by passing through the second accommodation parts 241. Thus, the first electrode terminal 261 and the second electrode terminal 262 may be exposed downward to be electrically connected to the power module 300.

A connection terminal may electrically connect the power module 300 to the heating rods 210. The connection terminal will be described below with reference to FIGS. 15A and 15B.

FIG. 4 is a plan view of a ceramic substrate according to an embodiment of the present invention, FIG. 5 is a cross-sectional view taken along line A-A' in FIG. 4, and FIG. 6 is an actual photograph showing a cross section of portion B in FIG. 5.

As described above, referring to FIG. 4, the ceramic substrate may include the first ceramic substrate 211a and the second ceramic substrate 211b.

After the heat-radiating element 212 is disposed on the first ceramic substrate 211a, the first ceramic substrate 211a and the second ceramic substrate 211b may be sintered (at 1500° C.) to integrally form the ceramic substrate 211. With the above configuration, one surface of the first ceramic substrate 211a and one surface of the second ceramic substrate 211b in contact with the one surface of the first ceramic substrate 211a may be aligned (arranged) and sintered.

The ceramic substrate 211 may contain alumina, zirconia toughened alumina (ZTA), SiN, or the like. The heat-radiating element 212 may be disposed in the ceramic substrate. The ceramic substrate 211 may receive heat generated from the heat-radiating element 212 and provide the heat to the first heat diffusion plate 213 and the second heat diffusion plate 214.

Referring to FIG. 5, the heat-radiating element 212 may be disposed on one surface of the first ceramic substrate 211a and one surface of the second ceramic substrate 211b in contact with the one surface of the first ceramic substrate 211a.

A thickness L1 of the ceramic substrate 211 may be in a range of 100 μm to 1000 μm. Preferably, the thickness L1 of the ceramic substrate 211 may be in a range of 200 μm to 800 μm, more preferably, in a range of 400 μm to 700 μm. When the thickness of the ceramic substrate 211 is less than 100 μm, owing to brittleness, the ceramic substrate 211 may be easily broken due to an external impact. Further, when the thickness of the ceramic substrate 211 is greater than 1000 μm, there is a problem in that a volume of the heating rod 210 is increased such that a volume of the heater 1000 is increased. Here, the thickness may be a length in the first direction (X-axis direction).

The heat-radiating element 212 may be disposed on one surface of the first ceramic substrate 211a and one surface of the second ceramic substrate 211b. A thickness L2 of the heat-radiating element 212 may be in a range of 10 μm to 100 μm. Preferably, the thickness L2 of the heat-radiating element 212 may be in a range of 30 μm to 70 μm and, more preferably, in a range of 40 μm to 60 μm.

When the thickness L2 of the heat-radiating element 212 is less than 10 μm, the thickness L2 of the heat-radiating element 212 in the present invention may be equal to a thickness of a pattern of the ceramic substrate 211. In this case, even when the pattern is formed on the ceramic substrate 211 by stamping, the ceramic substrate 211 has elasticity such that there is a limitation that intaglio of a predetermined thickness is restored.

When the thickness L2 of the heat-radiating element 212 is greater than 100 μm, the ceramic substrate 211 has a very thin thickness in a portion in which the pattern is disposed such that there is a limitation that the ceramic substrate 211 is separated due to the pattern.

Accordingly, a ratio of the thickness L2 of the heat-radiating element 212 to the thickness L1 of the ceramic substrate 211 may be in a range of 1:2 to 1:50. When the ratio of the thickness L2 of the heat-radiating element 212 to the thickness L1 of the ceramic substrate 211 is less than 1:2, the thickness L2 of the heat-radiating element 212 is large such that probability of occurrence of an electrical short-circuit increases. Consequently, an electrical defect of the heating rod 210 may occur. When the ratio of the thickness L2 of the heat-radiating element 212 to the thickness L1 of the ceramic substrate 211 is greater than 1:50, an area of a heating portion is reduced such that a temperature gradient may not be significantly improved.

Specifically, the ratio of the thickness L2 of the heat-radiating element 212 to the thickness L1 of the ceramic substrate 211 may be in a range of 1:5 to 1:20. With the above configuration, the thickness of the heat-radiating element 212 of the heating rod 210 is stably secured such that occurrence of electrical disconnection may be reduced. Further, a heating area of the heat-radiating element 212 may expand to improve the temperature gradient, and resistance of the heating rod 210 may be adjusted by controlling the thickness L2 of the heat-radiating element 212.

Further, when the ratio of the thickness L2 of the heat-radiating element 212 to the thickness L1 of the ceramic substrate 211 is in a range of 1:8 to 1:14 (e.g., NiCr of 50 μm is employed between the ceramic substrates (having thicknesses of 250 μm and 500 μm, respectively), the thickness L2 of the heat-radiating element 212 of the heating rod 210 is stably secured such that an occurrence rate of electrical disconnection may be significantly reduced.

Referring to FIG. 6, the heat-radiating element 212 may be formed to be disposed in the ceramic substrate 211, and the ceramic substrate 211 may be formed to surround the heat-radiating element 212.

FIGS. 7 to 9 are cross-sectional views of ceramic substrates according to various embodiments of the present invention.

Referring to FIGS. 7 to 9, the heat-radiating element 212 may have a convex shape in the first direction (X-axis direction) in the ceramic substrate 211. The heating rod 210 according to the embodiment of the present invention may be manufactured by forming a pattern on one surface of the ceramic substrate 211, arranging the heat-radiating element 212 in the pattern, and sintering the ceramic substrate 211. In this case, owing to the pattern formed on one surface of the ceramic substrate 211, the heat-radiating element 212 in the ceramic substrate 211 may have the convex shape. Further, the pattern may be intaglio.

Referring to FIG. 7, a case is illustrated in which the pattern is formed on only the second ceramic substrate 211b, and the heat-radiating element 212 may be convex in a 1-1 direction. Here, the 1-1 direction may be a direction from the heat-radiating element 212 toward the second ceramic substrate 211b which is one surface of the ceramic substrate 211.

Referring to FIG. 8, a case is illustrated in which the pattern is formed on only the first ceramic substrate 211a, and the heat-radiating element 212 may be convex in a 1-2 direction. Here, the 1-2 direction may be a direction from the heat-radiating element 212 toward the first ceramic substrate 211a which is the other surface of the ceramic substrate 211.

Referring to FIG. 9, the heat-radiating element 212 may be convex alternately in the 1-1 direction and the 1-2 direction in the ceramic substrate 211.

With the above configuration, the heating area of the heat-radiating element 212 in the ceramic substrate 211 is increased, and a contact area of the heat-radiating element 212 with the ceramic substrate 211 is increased such that a temperature gradient may be improved.

FIG. 10 is a flowchart illustrating a method of manufacturing a ceramic substrate according to an embodiment of the present invention, and FIGS. 11 and 12 are diagrams for describing formation of a pattern of a ceramic substrate according to an embodiment of the present invention.

Referring to FIG. 10, a method of manufacturing a ceramic substrate according to an embodiment of the present invention includes preparing a ceramic substrate (S300), forming a pattern on the ceramic substrate (S310), performing screen printing on the ceramic substrate using a metal paste (S320), and drying the ceramic substrate (S330).

The ceramic substrate 211 is prepared first, and then the pattern is formed on the ceramic substrate 211. Referring to FIG. 11, the ceramic substrate 211 may be disposed between a first substrate 1 and a second substrate 2. The first substrate 1 and the second substrate 2 may include stainless steel, but the present invention is not limited thereto.

A stamp 3 may be formed on one surface of the second substrate 2 facing the ceramic substrate 211. When a pressure F1 is applied to the second substrate 2, the pattern may be formed on the ceramic substrate 211 by the stamp 3 of the second substrate 2. The pattern may be intaglio and the pressure F1 may be 1 ton, but the present invention is not limited thereto. A period of time for applying the pressure F1 may be in a range of 4 minutes to 6 minutes, but the present invention is not limited thereto.

A plurality of stamps 3 may be provided and a plurality of patterns may be formed on the ceramic substrate 211. A thickness of each of the plurality of stamps 3 may be in a range of 500 μm to 1000 μm, but the present invention is not limited thereto. Further, the patterns may be alternately formed on the ceramic substrate 211 according to shapes of the stamps 3. Screen printing may be performed on the patterns formed on the ceramic substrate 211 using a metal paste.

Further, the metal paste may contain a metal particle, a resin, a dispersant, a glass frit, and a solvent. 50 wt % to 80 wt % of the metal particle may be contained in the metal paste, and 0.05 wt % to 3 wt % of the glass frit may be contained in the metal paste. Here, the metal particle may include at least one selected from among Mo, Ag, Ti, and Al. The glass fit may include any one selected from among calcium oxide (CaO), magnesium oxide (MgO), sodium oxide ($Na_2O$), silicon oxide ($SiO_2$), and titanium oxide ($TiO_2$), or a mixture thereof.

For example, the drying process may be performed under an atmosphere at a temperature in a range of 600° C. to 800° C. after the temperature rises at a rate of 10° C./min. As described above, when the metal paste is screen-printed and then treated at a low temperature (e.g., in the range of 600° C. to 800° C.), possibility of distortion occurrence of a layer may be reduced. However, when screen printing is performed using a metal paste and then a layer is dried, pores may occur in an interior of the layer and on a surface thereof.

Next, a sintering process is performed to manufacture a heater core (S340). In this case, the sintering process may be performed under a nitrogen atmosphere at 900° C. During the sintering process, the glass frit in the metal paste may serve to bond between the ceramic substrate and the layer and between the layers.

Referring to FIG. 12, the heat-radiating element 212 may be disposed in the pattern formed on the second ceramic substrate 211b by screen printing. In this case, a force which is applied to the heat-radiating element 212 due to sintering between the first ceramic substrate 211a and the second ceramic substrate 211b may be distributed to a surface C on which the second ceramic substrate 211b is in contact with the heat-radiating element 212. Consequently, a density of the pressure acting on the second ceramic substrate 211b is reduced such that damage to the second ceramic substrate 211b may be prevented.

The above description of the ceramic substrate may be equally applied to a heater according to an embodiment which will be described below with reference to FIGS. 13 to 15.

FIG. 13 is a plan view of a heat-radiating module on which a power module is installed according to an embodiment of the present invention, and FIG. 14 is a cross-sectional view of FIG. 13.

Referring to FIG. 13, one side of the heat-radiating module 200 may be coupled to the power module 300. As described above, the heat-radiating module 200 may be fitted and coupled to the power module 300 in a state of being installed on the case 100.

The power module 300 may include a substrate part 310, a heat sink 320, and a ventilation part 301.

The substrate part may include a switching element for switching heating of the heating rod in response to an external signal or the like. However, the present invention is not limited thereto, and various elements for supplying power to various heat-radiating modules 200 may be employed.

The substrate part may include a circuit element and thus heat may be generated. When a temperature of the circuit element is high due to the generated heat, malfunction may occur and reliability may be degraded. Thus, the substrate part may be connected to the heat sink 320.

The heat sink 320 may be disposed to be connected to the substrate part. For example, the heat sink 320 may be in contact with one surface of the substrate part to absorb heat generated therefrom. The heat sink 320 may receive the heat from the substrate part to lower a temperature of the substrate part.

The heat sink 320 may include a louver fin or a radiating plate, but the present invention is not limited thereto.

The ventilation part 301 allows a fluid to flow into and out of the heat sink 320. The ventilation part 301 may be formed to pass through between the power module 300 and the case 100. The ventilation part 301 may be disposed adjacent to the heat-radiating module 200. More specifically, the ventilation part 301 may be formed between the case 100 and the power module 300 or between the heat-radiating module 200 and the heat sink 320. Consequently, the fluid may move through between the heat sink 320 and the radiation fins of the heat-radiating module 200. That is, the heat generated from the heat sink 320 may be discharged in a direction that is the same as a direction in which the fluid is discharged such that the heat of the power module may be reduced. Further, the heat generated from the heat sink 320 and the heat generated from the power module are provided to the fluid such that thermal efficiency of the heat-radiating module 200 may be further increased.

The ventilation part 301 provides a flow path for allowing the fluid to flow to the heat sink 320 such that the fluid may flow to an outlet side even through the power module 300. With the above configuration, it is possible to solve a pressure drop caused by the heater partially blocking the fluid from flowing in and out.

Further, a direction in which the fluid flows in and out in the ventilation part 301 may be the same as a direction in which the fluid flows from the inlet to the outlet of the case. With the above configuration, the fluid flowing in the ventilation part 301 may receive heat from the heat sink 320 to be discharged to the outlet side. Consequently, heat radiation efficiency may be improved. Further, the heat generated from the substrate part may be used to be thermally transferred to improve energy efficiency.

Referring to FIG. 14, the fluid may pass through the heat-radiating module 200. A fluid $b_1$ flowing in the heat-radiating module 200 may be heated while passing through the heat-radiating module 200. Further, the fluid $b_2$ passing through the heat-radiating module 200 may be discharged to an interior of, for example, a vehicle which requires a heated fluid.

Further, the fluid may pass through the ventilation part 301 of the power module 300. A fluid $c_1$ flowing in the heat sink 320 through the ventilation part 301 may be heated while passing through the heat sink 320.

For example, a fluid $c_2$ which has passed through the heat sink 320 may be discharged to the interior of the vehicle together with the fluid $b_2$ passing through the heat-radiating module 200.

In order to allow the fluids to flow in the same direction, the heat sink 320 and the radiation fins of the heat-radiating module 200 may include louver pins having the same shape.

Further, an area in which the fluid flows in the ventilation part 301 may be reduced in a direction in which the fluid flows out. The ventilation part 301 may have an area in which the fluid flows which is reduced from a side through which the fluid flows in toward a side through which the fluid flows out. That is, during the same period of time, an amount of the fluid $c_1$ flowing in the heat sink 320 may be greater than that of the fluid $c_2$ passing through the heat sink 320. With the above configuration, it is possible to prevent the fluid passing through the heat sink 320 from flowing backward.

Similarly, an area of a portion of the heat sink 320 through which the fluid flows out may also be smaller than an area of a portion thereof through which the fluid flows in.

Consequently, the ventilation part 301 and the heat sink 320 may sufficiently transfer heat to air which flows therein and then discharge the sufficiently heated air.

FIGS. 15A and 15B are diagrams illustrating a connection terminal and the power module in the heat-radiating module in FIG. 13.

Referring to FIG. 15A, an electrode terminal N may be electrically connected to a connection terminal P disposed in the first direction (X-axis direction) of the heating rods. Further, the electrode terminal N may be electrically connected to the substrate part 310 to receive power.

The connection terminal P may be disposed in the heat-radiating module 200. Alternatively, the connection terminal P may be disposed on an outer portion of the heat-radiating module 200. For example, the connection terminal P may be disposed on a side portion from the power module 300 in the third direction (Z-axis direction) and the outer portion in the first direction (X-axis direction) in the heat-radiating module. The connection terminal P may be electrically connected to each of the heating rods.

Consequently, the ventilation part 301 may be disposed adjacent to the heat-radiating module 200, and an area through which a fluid passes may be formed to be large. Thus, the ventilation part 301 is disposed adjacent to one sides of the heating rods and the radiation fins in the third direction (the Z-axis direction) such that a portion of air flowing in the heat-radiating module 200 may smoothly pass through the ventilation part 301.

As in FIG. 15A, referring to FIG. 15B, an electrode terminal N' may be electrically connected to a connection terminal P' and the substrate part 310 which are disposed in the first direction (X-axis direction) of the heating rods. For example, the electrode terminal N' may be disposed between the substrate part 310 and the connection terminal P'.

The connection terminal P' may be disposed between the radiation fins, the heating rods, and the power module. The connection terminal P' may be disposed adjacent to the power module 300. Further, the connection terminal P' may be electrically connected to the electrode terminal N' and the heating rods. Further, as described above, the ventilation part 301 may be disposed adjacent to the heat-radiating module, and a portion of the air flowing in the heat-radiating module through the ventilation part 301 may be discharged through the ventilation part 301. Consequently, an amount of the fluid being discharged is increased, and the fluid passing through the ventilation part 301 may be discharged in a state of receiving heat from the heat sink 320. Thus, thermal efficiency of the heater according to the embodiment of the present invention may be improved.

FIG. 16 is a conceptual diagram illustrating a heating system according to an embodiment of the present invention.

Referring to FIG. 16, a heating system 2000 of the present embodiment may be employed in various forms of transportation. Here, the forms of transportation are not limited to vehicles such as an automobile and the like which run on land and may include a ship, an airplane, and the like. However, a case in which the heating system 2000 of the present embodiment is employed in an automobile will be described below as an example.

The heating system 2000 may be accommodated in an engine room of a vehicle. The heating system 2000 may include a supply part 400, a flow path 500, a discharge part 600, and a heater 1000.

Various air supply devices such as a blowing fan, a pump, and the like may be used as the supply part 400. The supply part 400 may allow a fluid outside the heating system 2000 to move in the flow path 500, which will be described below, and to move along the flow path 500.

The flow path 500 may be a passage through which a fluid flows. The supply part 400 may be disposed on one side of the flow path 500, and the discharge part 600 may be disposed on the other side of the flow path 500. The flow path 500 may connect an engine room to an interior of the vehicle in an air conditioning manner.

A blade capable of being opened and closed may be used as the discharge part 600. The discharge part 600 may be disposed on the other side of the flow path 500. The discharge part 600 may communicate with the interior of the vehicle. Therefore, the fluid moving along the flow path 500 may flow in the interior of the vehicle through the discharge part 600.

The above-described heater 1000 of the embodiment of the present invention may be used as the heater 1000 of the heating system 2000. Hereinafter, a description of the same technical idea will be omitted. The heater 1000 may be disposed in the form of a partition wall at an intermediate position of the flow path 500. In this case, front and rear sides of the heater 1000 may be the same as or similar to those of the vehicle. A cool fluid in the engine room, which is fed to the flow path 500 through the supply part 400, may be heated while passing through the heater 1000 from the front side to the rear side and then may flow along the flow path 500 to be supplied to the interior of the vehicle through the discharge part 600.

Further, unlike the conventional PTC thermistor, in the heater 1000 of the present embodiment, heat transfer may be carried out by a heat-radiating element which is covered by a ceramic substrate. Heat efficiency may be increased using a high heating value of the heat-radiating element. Further, thermal stability may be achieved by covering the heat-radiating element having the high heating value with a ceramic material having a high heat transfer rate, and at the same time, thermal efficiency may be maintained.

Further, the heater 1000 of the present embodiment may be free from heavy metal materials such as Pb and the like and may be lightweight. While the present invention has been mainly described with reference to the exemplary embodiments, it should be understood that the present invention is not limited to the disclosed exemplary embodiments, and various modifications and applications can be devised by those skilled in the art to which the present invention pertains without departing from the gist of the present invention. For example, each component specifically shown in the exemplary embodiments can be modified and implemented. It should be construed that differences related to these modifications and applications will fall within the scope of the present invention defined by the appended claims.

The invention claimed is:

1. A heating rod comprising:
   a ceramic substrate;
   a heat-radiating element disposed in the ceramic substrate;
   a first electrode terminal electrically connected to one end of the heat-radiating element; and
   a second electrode terminal electrically connected to an opposite end of the heat-radiating element,
   wherein a ratio of a thickness of the heat-radiating element to a thickness of the ceramic substrate is in a range of 1:2 to 1:50,
   wherein the heat-radiating element is convex alternately in a 1-1 direction and a 1-2 direction of the ceramic substrate, and
   wherein the 1-1 direction is from the heat-radiating element toward one surface of the ceramic substrate, and the 1-2 direction is from the heat-radiating element toward an opposite surface of the ceramic substrate.

2. The heating rod of claim 1, further comprising a heat diffusion plate disposed on at least one of an upper portion and a lower portion of the ceramic substrate.

3. The heating rod of claim 2, wherein the heat diffusion plate comprises:
   a first heat diffusion plate disposed on one side of the ceramic substrate; and
   a second heat diffusion plate disposed an opposite side of the ceramic substrate.

4. The heating rod of claim 3, wherein the ceramic substrate is disposed between the first heat diffusion plate and the second heat diffusion plate, and
   wherein the heat-radiating element is disposed between a first thermal diffusion plate and a second thermal diffusion plate.

5. The heating rod of claim 3, wherein the first heat diffusion plate has a thermal expansion coefficient equal to a thermal expansion coefficient of the second heat diffusion plate.

6. The heating rod of claim 1, wherein the ceramic substrate includes at least one among alumina, zirconia toughened alumina (ZTA), and SiN.

7. The heating rod of claim 1, wherein the heat-radiating element includes at least one among Mo, Ag, Ti, Ru, W, Ni, Cr, and Al.

8. The heating rod of claim 1, wherein the thickness of the heat-radiating element is in a range of 10 μm to 100 μm and wherein the thickness of the ceramic substrate is in a range of 100 μm to 1,000 μm.

9. The heating rod of claim 1, wherein the thickness of the heat-radiating element is in a range of 30 μm to 70 μm.

10. The heater of claim 1, wherein the thickness of the heat-radiating element is in a range of 40 μm to 60 μm.

11. A heater comprising:
a case;
a heat-radiating module disposed in the case and including a heating rod; and
a power module electrically connected to the heat-radiating module,
wherein the heating rod includes:
a ceramic substrate; and
a heat-radiating element disposed in the ceramic substrate, and
wherein a ratio of a thickness of the heat-radiating element to a thickness of the ceramic substrate is in a range of 1:2 to 1:50,
wherein the heat-radiating element is convex alternately in a 1-1 direction and a 1-2 direction of the ceramic substrate, and
wherein the 1-1 direction is from the heat-radiating element toward one surface of the ceramic substrate, and the 1-2 direction is from the heat-radiating element toward an opposite surface of the ceramic substrate.

12. The heater of claim 11, wherein the power module includes:
a substrate part;
a heat sink connected to the substrate part; and
a ventilation part through which a fluid flows into and out of the heat sink.

13. The heater of claim 11, wherein the heat-radiating module includes:
a plurality of heating rods;
a plurality of radiation fins disposed between adjacent heating rods; and
gaskets disposed on one side and an opposite side in the case,
wherein the heat-radiating module further includes a connection terminal disposed at an outer portion of the heat-radiating module, and
wherein the connection terminal electrically connects the plurality of heating rods to the power module.

14. The heater of claim 12, wherein the case includes:
an inlet; and
an outlet disposed to be opposite to the inlet,
wherein a direction in a which the fluid flows in and flows out is the same as a direction from the inlet toward the outlet,
wherein the ventilation part is disposed adjacent to the heat-radiating module, and
wherein the ventilation part has an area, through which the fluid passes, which is decreased in a direction in which the fluid flows out.

15. The heater of claim 11, further comprising a heat diffusion plate disposed on at least one of an upper portion and a lower portion of the ceramic substrate.

16. The heater of claim 11, wherein the ceramic substrate includes at least one among alumina, zirconia toughened alumina (ZTA), and SiN.

17. The heater of claim 11, wherein the heat-radiating element includes at least one among Mo, Ag, Ti, Ru, W, Ni, Cr, and Al.

18. The heater of claim 11, wherein the thickness of the heat-radiating element is in a range of 10 μm to 100 μm, and
wherein the thickness of the ceramic substrate is in a range of 100 μm to 1,000 μm.

19. The heater of claim 11, wherein the thickness of the heat-radiating element is in a range of 30 μm to 70 μm.

20. The heater of claim 11, wherein the thickness of the heat-radiating element is in a range of 40 μm to 60 μm.

* * * * *